United States Patent [19]

Paust et al.

[11] Patent Number: 4,740,051
[45] Date of Patent: Apr. 26, 1988

[54] LIGHT TRANSMITTING FIBER CABLE CONNECTOR PLUG

[75] Inventors: Peter Paust, Engelsbrand; Erwin Sauter, Neulingen, both of Fed. Rep. of Germany

[73] Assignee: INOVAN-Stroebe GmbH & Co. KG, Birkenfeld, Fed. Rep. of Germany

[21] Appl. No.: 588,146

[22] Filed: Mar. 9, 1984

[30] Foreign Application Priority Data

Mar. 11, 1983 [DE] Fed. Rep. of Germany ....... 3308679

[51] Int. Cl.⁴ .................................................. G02B 6/38
[52] U.S. Cl. .................................................. 350/96.21
[58] Field of Search ............... 350/96.20, 96.21, 96.22, 350/96.23

[56] References Cited

U.S. PATENT DOCUMENTS

| | | | |
|---|---|---|---|
| 4,274,708 | 6/1981 | Cocito et al. | 350/96.21 |
| 4,279,467 | 7/1981 | Borsuk et al. | 350/96.21 |
| 4,281,892 | 8/1981 | Sitabkhan | 350/96.21 |
| 4,300,815 | 11/1981 | Malsot et al. | 350/96.20 |
| 4,352,542 | 10/1982 | Tydings | 350/96.21 |
| 4,373,778 | 2/1983 | Adham | 350/96.20 |
| 4,421,383 | 12/1983 | Carlsen | 350/96.21 |
| 4,435,038 | 3/1984 | Soes et al. | 350/96.21 |
| 4,458,985 | 7/1984 | Balliet et al. | 350/96.21 |

*Primary Examiner*—William L. Sikes
*Assistant Examiner*—Robert E. Wise

[57] ABSTRACT

A plug connector for interconnecting light transmitting glass fiber cables having cable engagement means disposed in a housing which receives the ends of the light transmitting fibers. The fibers are guided and centered within the housing by a double conical leaf spring sleeve which centrally locates the fiber ends in alignment with, and abutting, one another for efficient light transmission from one to the other of said light transmitting fibers.

13 Claims, 4 Drawing Sheets

LIGHT TRANSMITTING FIBER CABLE CONNECTOR PLUG

BACKGROUND OF THE INVENTION

The invention relates to connector plugs for light transmitting fiber cables which enter the connector plugs from opposite ends and are releasably engaged such that the fiber ends abut one another.

Connector plugs for light transmitting fiber cables serve to interconnect the ends of two light transmitting fiber cables as well as to connect a cable to a converter, for example. Such optical connector plugs are necessary members of optical light transmission systems, which have to fulfill specific requirements. In addition to a secure connection there should be little attenuation which is dependent on a good number of factors. The low attenuation must remain unchanged over a large number of connecting cycles wherein 100 plug-in cycles is considered to be the minimum.

The attenuation at the joints of two fibers depends on
(a) the dislocation of the two fibers
(b) the gap between the face surfaces
(c) the angle deviation.

The dislocation of two fibers is the distance between the parallel axes of the abutting fibers and the angle deviation from parallel at which the fibers intersect.

There are several fiber cable connectors so designed as to maintain fiber dislocation and angle deviation of such connectors as small as possible. The best known connector supports the glass fiber cable with its coating in a mounting member, wherein the glass fiber is clamped at the entering end for axially positioning the fiber. At its free end the glass fiber is stripped and supported in a centering member. Two of those centering members with the glass fiber ends disposed therein are inserted coaxially into a cylindrical housing from its opposite ends until the glass fiber ends abut. In this position the centering members are then fixed by screws or cement.

Assembly of such a connector, however, is difficult since the coating has to be removed from the front end of the glass fiber and the glass fiber has to be introduced into the centering member so that the glass fiber is properly inserted into a connector crystal and is properly retained in abutment with the face of the connector crystal by means of the crimping sleeve. Apparatus and methods for the removal of the plastic coating are already known with which it is relatively easy to slip the coating off the fiber, especially if the coating is heated. If the coating, however, consists of a silicon layer, it is important that the coating is completely removed since otherwise no proper adhesion between the glass fiber and the cement will be obtained.

The light conducting fibers as presently used, those with glass as well as those with plastic coatings, and also those with glass and plastic coatings, are all difficult to insert into the centering member. The glass coating without additional plastic coating, however, has the advantage that it need not be removed from the fiber at the connecting point but is simply broken or cut off together with the glass fiber.

In place of the connector crystal into whose central opening the glass fiber is to be introduced, centering devices have become known which support the glass fibers in centering elements. Such centering elements are, for example, fiber rods of relatively large cross-sectional areas which are surrounded by a sleeve and support the glass fibers concentrically therein or members with V-shaped grooves by whose side walls the glass fibers which are to be interconnected are supported. With such connectors it is practice to leave a gap at the point of fiber jointure which gap is filled with an immersion (wetting) oil in order to eliminate, to some extent, the consequences of inaccuracies such as fiber dislocation, gap size between fiber faces and angle deviations.

It is obvious that such fiber cable connectors need to be manufactured with great accuracy and that, considering their use of relatively rare materials, they are quite expensive.

It is the main object of the present invention to provide such a light conducting cable connector which, to a large extent, eliminates the causes of high attenuation, that is, fiber dislocation, gaps between fiber faces and angle deviations and which may be manufactured at reasonable expense from easily available materials and without the requirement for high precision work.

SUMMARY OF THE INVENTION

In a plug connector for interconnecting light transmitting fiber cables, the cable ends are engaged and supported in a tubular housing by cable engagement means mounted on the cable ends. The light transmitting fibers project from the engagement means toward one another and are held and located by a double conical leaf spring sleeve supported in the housing and guiding, at the same time, both fiber ends so as to hold them in axial alignment and in abutment with one another for efficient light transmission from one fiber end to the other.

The main member of such a connector is the centering device which engages the glass fibers and positions them in axial alignment with one another and as close to one another as possible. In prior art connectors, these centering devices consisted of connector crystals (diamonds, rubies) in combination with centering elements and a coaxial support housing or in the use of fiber or groove supports. In some arrangements these supports are mounted by eccenter elements in order to permit adjustment of the axial alignment of the glass fibers being joined.

With the arrangement according to the present invention, however, the centering device takes the form of a double conical leaf spring sleeve which has face surfaces abutting a housing wall. In contrast to prior art arrangements the centering elements utilized are not rigid elements which need to be precisely guided axially and radially and movably supported, but consist of elastic spring-type elements which securely guide the ends of the fibers together, while engaging the fibers at their outer surfaces, in such a manner that the glass fiber axes are in alignment with one another. This arrangement does not permit fiber dislocation nor angle deviation. The gap between the fiber ends is adjustable by adjusting the fiber engagement means by way of simple adjustment means which permit accurate control of the movement of the fiber ends toward, and away from, one another. It is, for example, possible to provide engagement means which are screwed into the connector housing against an adjustable stop or against washers that are selected as desired so that the end faces of the fibers which are supported at a predetermined distance from the engagement means are just in contact with one another. It is also possible to utilize a two-piece housing whose pieces are adjustably interconnected by screw fasteners. Instead of screw fasteners it is possible to utilize snap connectors which facilitate separation and whch are similar to the known normal electrical plug connectors. Such connectors would be especially suitable in connection with plug-in connector strips for connecting optical as well as electrical conductors.

Essential for the proper mounting of the glass fibers and the relatively inexpensive manufacture of the connectors is the leaf spring type sleeve support structure according to the invention. The leaf spring type sleeve also facilitates mounting of the glass fiber ends by inserting the glass fiber ends and fixing them a predetermined distance from the fact of the engagement means with a crimping tool and introducing them subsequently into the connector, that is, into the spring sleeve therein. Insertion of the glass fiber into the spring sleeve is quite easy since the leaf spring sleeve is spread open before the insertion of the glass fiber, that is, before engagement of the plug-in connectors or the engagement means which position the glass fibers so that the glass fiber ends are easily guided into the relatively large funnel-shaped opening in the resilient sleeves. When the engagement means are moved together by the respective adjustment means, not only the glass fiber ends are moved together until they abut one another but they are also engaged under pressure by the leaf springs of the leaf spring sleeve and the glass fiber ends are moved together in such a manner that their axes are in alignment. It is important in this connection that the leaf spring sleeve is capable to make up for a relatively large difference in length of the fiber ends and the leaf springs therefore are in engagement with the fiber ends over a relatively large length. Manufacture of the spring sleeves and their utilization is without problems.

There may be provided and adjustment block serving as a mounting aid which may be connected to the engagement means which is to be inserted into the connector housing. For the preparation of the connection, the glass fiber ends fixed in the egagement means can then be inserted into the adjustment block and can be fixed therein for a desired period, for example, by means of a cement which softens upon heating. Then the end face of a fiber may be worked until it coincides with the face of the adjustment block. After removal of the glass fiber from the adjustment block, the adjustment block can be removed from the engagement means and the glass fiber ends will then be not only properly spaced from the engagement means but their faces will be exactly normal to the glass fiber axis.

The leaf spring sleeve may be made in various ways. It may, for example, consist of a nubmer of inwardly bent leaf springs which are held spaced from one another between tubular flanges arranged at the opposite ends wherein the tubular flanges may be closed at their end faces except for central openings. Such a member may be made of an elastic metallic material or of plastic and would then be suitably molded in a single piece.

In a preferred embodiment the leaf spring sleeve is formed from a metal strip with adjacent cutouts, which metal strip is rolled together so that its ends abut and they are connected together. The cutouts are preferably parallelogram-shaped with rounded edges or they are in the shape of an ellipse. A simple arrangement is given when the cutouts are parallel slots extending across the strip up to the sides which will form the tubular flanges and the leaf sections remaining between the slots are pressformed out of the plane of the strip. Upon compressing of a leaf spring sleeve formed from such a strip, the leaf springs abut the outside of the glass fibers and propperly position them as previously described. The number of leaf springs in the leaf spring sleeve is suitably uneven, for example three, in order to obtain accurate guiding support of the adjacent glass fiber surfaces. In order to prevent corrosion of the leaf springs or the leaf spring sleeves, they are provided with a corrosion inhibiting coating; they are, for example, gold plated.

All together the present invention provides for a connector plug with a centering member that avoids mounting mistakes, that is, fiber dislocation, gaps between fiber ends, and angle deviation, and which, furthermore, is easy and inexpensive to manufacture.

SHORT DESCRIPTION OF THE DRAWINGS

Figure 10:
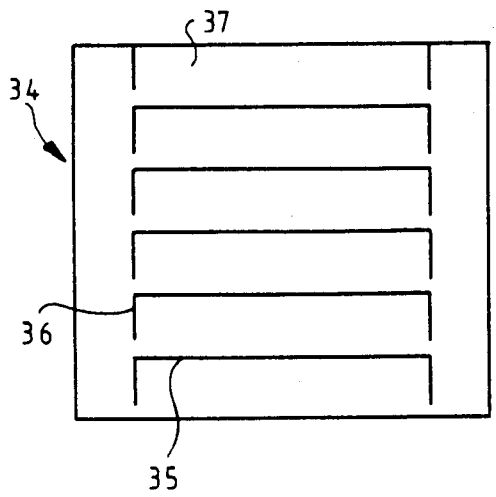
FIG. 10 shows a punched out strip intended for the manufacture of anotehr leaf spring sleeve.
Figure 12:
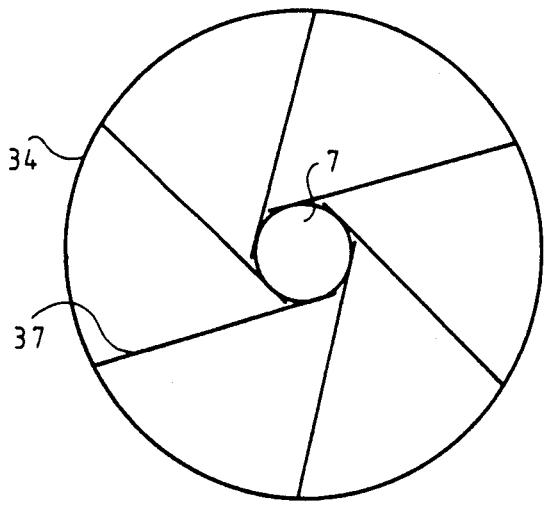
Figure 13:
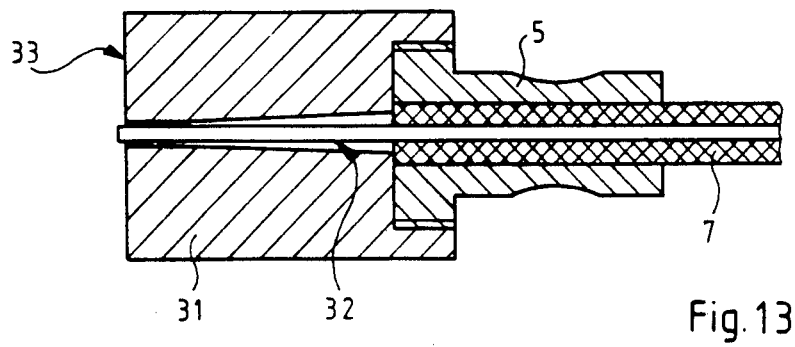

FIG. 12 indicates the functioning of a leaf spring sleeve manufactured from the strip shown in FIG. 10; and FIG. 13 shows an adjustment block.

DESCRIPTION OF THE PREFERRED EMBODIMENTS

Figure 1:
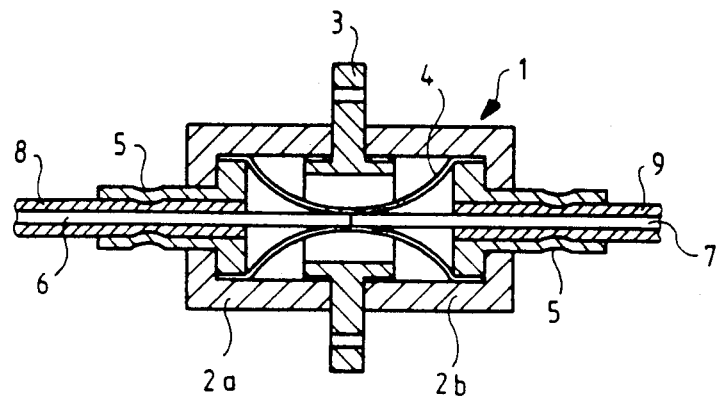
FIG. 1, FIG. 2 and FIG. 3 show different embodiments of a connector.

A connector 1 as shown in FIG. 1 consists of a cylindrical housing comprising two parts 2a and 2b which are interconnected by means of a screw flange 3. Disposed in the housing is a leaf spring sleeve 4, which at opposite ends, is in abutment with crimp jackets 5 which are flanged and inserted into opposite ends of the housing 2a, 2b. The crimp jackets 5 are engagement means. Received in the crimp jackets 5 are glass fibers 6, 7 which have coatings 8, 9 engaged by the crimp jackets as they àre crimped onto the coatings 8, 9 for firm axial positioning. The exposed portions of the glass fibers 6, 7 project beyond the crimp jackets 5 and are inserted into the leaf spring sleeve 4 such that the faces of the glass fibers are in abutment with one anotehr. Engagement of the outer surfaces of the two glass fibers 6, 7 by the various leaf springs 10 causes not only firm retainment of the glass fiber ends within the leaf spring sleeve 4 but they are also so positioned that they are in axial alignment with one another. This result is achieved even if the diameters of the two glass fibers are slightly different, and also if the glass fiber cross-section is not perfectly circular. A plug-in connection in accordance with the invention is essentially completed by removing the coating from the glass fibers for a certin distance, locating and engaging the glass fibers in the crimp jackets 5 and then inserting them into the housing, that is, into the leaf spring sleeve 4. After screw coupling the two housing halves 2a, 2b, the glass fiber ends are securely adjusted and retained in their proper positions.

If the glass fiber coating is a glass coat, its removal is not necessary, for this kind of light wave conductors requires only the proper axial positioning in the crimp jackets 5.

In order to facilitate mounting, there may be provided an adjustment block 31 (FIG. 13) which may be screwed onto the crimp jackets 5. The adjustment block 31 has a central passage 32 which is slightly conical, narrowing toward the free end thereof, into which passage 32 the glass fiber projects. The end of the glass fiber 7 which projects slightly from the face 33 of block 31 may then be worked down until the end face of the glass fiber is in planar alignment with the face 33 of the bock 31. Then the adjustment block 31 is removed from the crimp jacket 5. The free end of the glass fiber is then not only of proper length relative to the face of the face of the crimp jacekt 5, but, in addition, has an end face which is exactly normal to the glass fiber axis.

There are no great skills necessary, especially, there is no cementing required which is a critical step in connection with light wave conductors with silicon coatings. There is, furthermore, no need for precision parts since the leaf spring sleeve 4 securely retains and positions the glass fiber ends.

Figure 2:
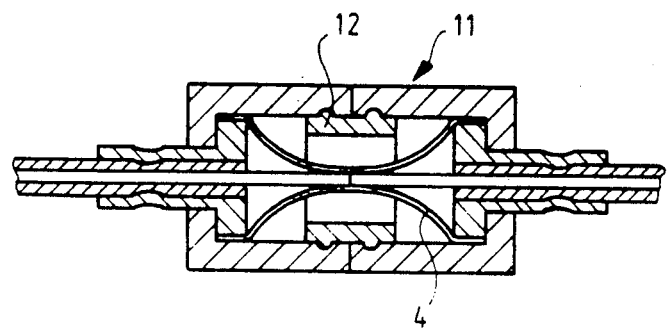

FIG. 2 shows a plug-in connector 11 similar to that shown in FIG. 1 provided, however, with a snap-in joint. It has a resilient interior sleeve 12 provided with nubs adapted to snap into cavities or annular grooves in the inner walls of the housing. This embodiment has the advantage that it may be utilized in combination with electrical connectors in a single plug-in strip.

Figure 3:
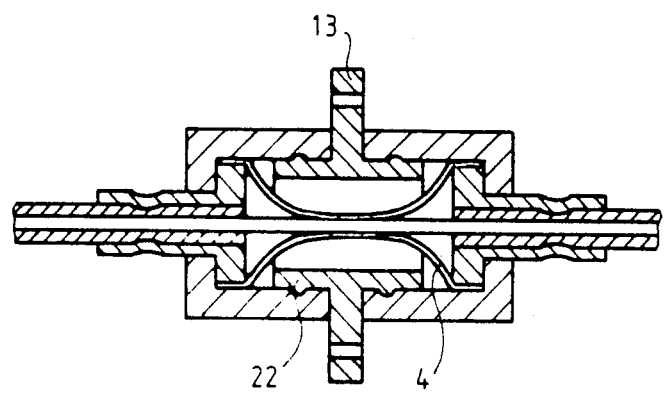

A similar structure is shown in FIG. 3 wherein the resilient interior sleeve 22, however, is provided with a flange 13.

Figure 4:
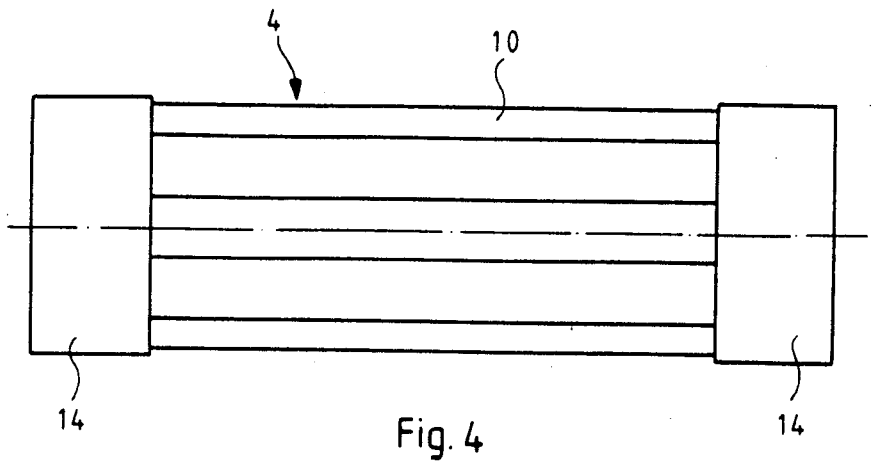
FIG. 4 shows a leaf spring sleeve with the leaf springs stretched.

FIG. 4 shows a leaf spring sleeve 4 which is composed of a number of leaf springs 10 which are carried by tubular flanges 14.

Figure 5:
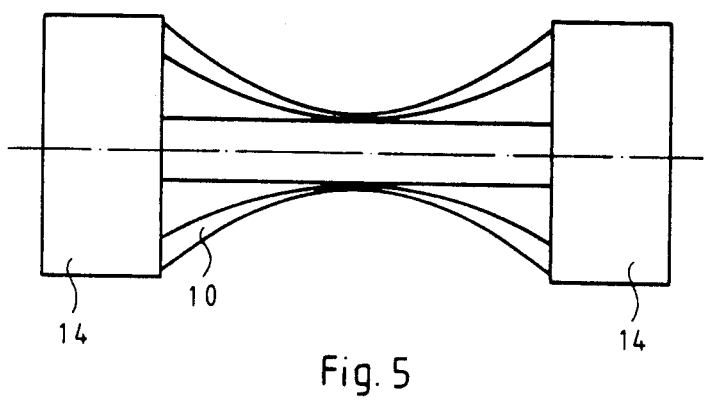
FIG. 5 shows the same leaf spring sleeve in compressed state.
Figure 6:
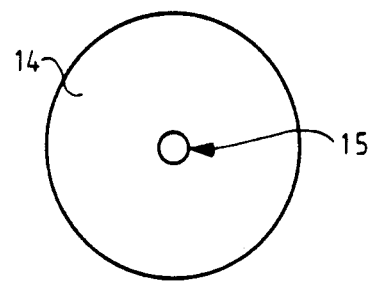
FIG. 6 is a frontal view of the leaf spring sleeve of FIGS. 4 and 5.

FIG. 5 shows the leaf spring sleeve of FIG. 4 with the leaf springs 10 bent inwardly. The tubular end flanges 14 may be closed at their end faces except for a central opening 15 for the insertion of the glass fiber ends as shown in FIG. 6.

Figure 7:
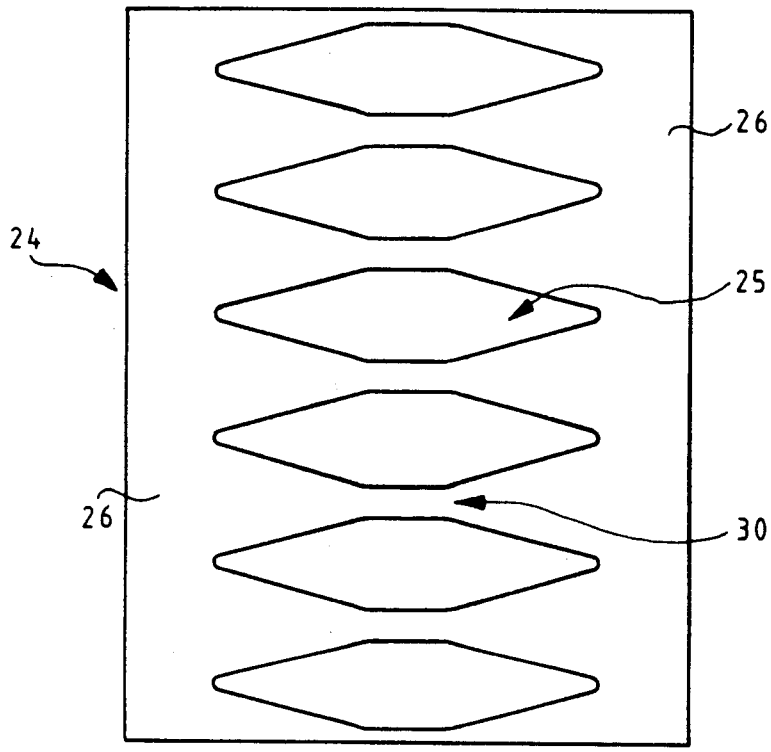
FIG. 7 shows a metal strip punched out for the manufacture of a leaf spring sleeve.
Figure 8:
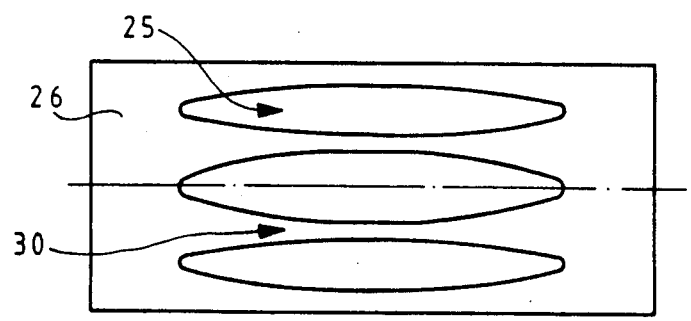
FIG. 8 shows the metal strip of FIG. 7 rolled and connected together.
Figure 9:
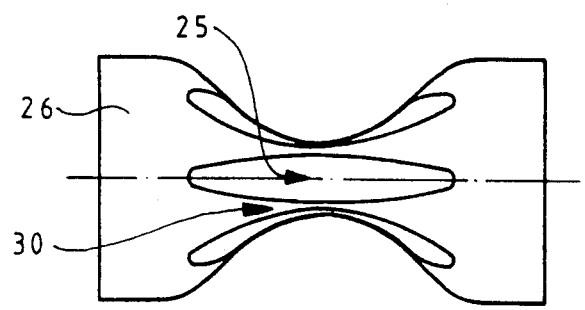
FIG. 9 shows the finished leaf spring sleeve in its compressed state.

Steps in the manufacture of a single piece leaf spring sleeve are shown in FIGS. 7 to 9. The starting material is a strip 24 (FIG. 7) which is punched out ladder-like with cutouts 25. The "spars" 26 of thin ladder-like strip 24 may be bent inwardly to form a closed face side as shown in FIG. 6. The cutouts 25 are parallelogram-shaped with the corner areas being rounded. FIG. 8 shows the strip 24 rolled together with the ends interconnected. In this manner the strip again becomes a leaf spring sleeve like that shown in FIG. 4. As shown in FIG. 9 the leaf springs are bent inwardly to form the final leaf spring sleeve, the leaf springs being represented by the webs 30 between the cutouts 25.

Figure 11:
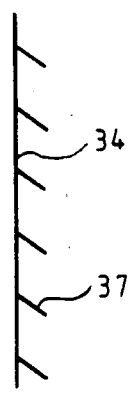
FIG. 11 is a side view of the strip shown in FIG. 10.

A different arrangement is shown in FIGS. 10–12 wherein a strip 34 is again punched out ladder-like wherein the cutouts, however, are only in the form of cross slots 35 with end slots 35 which extend normal to and at the ends of, the cross slots. This provides for leaf springs 37 which are bent out of the plane of the strip 34 as shown in FIG. 11. If the strip 34 is now rolled again together so as to form a leaf spring sleeve and compressed by pressure on its end faces, the leaf springs 37 are arranged as shown in FIG. 12 abutting tangentially a glass fiber 7 and engaging it.

We claim:

1. A plug connector for light transmitting glass fiber cables, comprising: a plug housing, cable engagement means mounted in axially engageable opposite ends of said housing, said cable engagement means receiving, holding and retaining in position the ends of two light transmitting fiber cables and a centering member disposed in said housing and receiving and engaging the free ends of said fiber cables so as to locate them centrally with said housing face to face with one another, said centering member being a double conical leaf spring sleeve having tubular axial end portions abutting said engagement means and narrow resilient radially inwardly projecting continuously arched spring center sections extending between said tubular axial end portions and adapted to be flexed radially inwardly toward one another when said spring sleeve is axially compressed upon axial engagement of the opposite ends of said housing thereby firmly receiving betwween said spring center sections both ends of said fiber cables for retaining them centrally and in axial alignment with one another.

2. A plug connector according to claim 1, wherein said engagement means are axially adjustably supported in said housing.

3. A plug connector according to claim 1, wherein said housing is divided into two sections along a plane normal to the glass fiber axis, said two sections being axially adjustable relative to one anotehr by adjustment means.

4. A plug connector according to claim 1, wherein said adjustment means is a flanged sleeve onto which the two housing sections are screwed.

5. A plug connector according to claim 4, wherein said adjustment means are ball notch type snap-in connectors.

6. A plug connector according to claim 1, wherein said leaf spring sleeve consists of axially spaced tubular flanges having a number of circumferentially spaced radially inwardly bent leaf springs mounted thereon.

7. A plug connector according to claim 1, wherein said leaf spring sleeve consists of a ladder-like punched strip rolled together and having the ends interconnected.

8. A plug connector according to claim 7, wherein the spars forming the tubular flanges are bent to provide for end faces on the tubular flanges.

9. A plug connector according to claim 7, wherein said ladder-like punched strip has cutouts which are in the form of parallelograms with rounded corner areas.

10. A plug connector according to claim 9, wherein cross slots are cut into said strip with end slots at the ends of, and normal to, said cross slots, and the strip portion defined by said cross and end slots being bent out of the plane of said strip.

11. A plug connector according to claim 1, wherein there is provided an uneven number of at least three leaf springs.

12. a plug connector according to claim 1, wherein said leaf spring sleeve consists of an elastic metallic material.

13. A plug connector according to claim 12, wherein said leaf springs are provided with a corrosion resistant layer.

* * * * *